United States Patent
Chang et al.

(10) Patent No.: US 6,521,902 B1
(45) Date of Patent: Feb. 18, 2003

(54) PROCESS FOR MINIMIZING ELECTROSTATIC DAMAGE AND POLE TIP RECESSION OF MAGNETORESISTIVE MAGNETIC RECORDING HEAD DURING POLE TIP TRIMMING BY FOCUSED ION BEAM MILLING

(75) Inventors: Thomas Young Chang, Menlo Park, CA (US); Michael Andrew Parker, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/638,507

(22) Filed: Aug. 15, 2000

(51) Int. Cl.[7] .................. H01J 37/08; A61N 5/00; C23C 14/00; C25B 11/00; C25B 13/00
(52) U.S. Cl. ............... 250/492.21; 250/492.3; 204/298.36; 29/603.13
(58) Field of Search ............ 250/492.2, 492.23; 29/603.13; 204/298.36

(56) References Cited

U.S. PATENT DOCUMENTS

| | | | |
|---|---|---|---|
| 5,401,972 A | | 3/1995 | Talbot et al. |
| 5,541,411 A | | 7/1996 | Lindquist et al. |
| 6,269,533 B2 | * | 8/2001 | Dugas ............ 29/603.13 |
| 6,332,962 B1 | * | 12/2001 | Athas et al. ........ 204/192.34 |

FOREIGN PATENT DOCUMENTS

| | | |
|---|---|---|
| JP | 60-126834 | 7/1985 |
| JP | 06-134582 | 5/1994 |
| JP | 06-134583 | 5/1994 |
| JP | 07-122484 | 5/1995 |
| JP | 09-164489 | 6/1997 |
| JP | 10-092364 | 4/1998 |

OTHER PUBLICATIONS

Annotated photograph illustrating use of Micrion ion milling device dated Mar. 9, 1998.
Micrion MicroMill HT, Focused Ion Beam Systems.
Journal of Applied Physics, vol. 87, No. 9, May 1, 2000, Design tradeoffs for beyond 10 Gb/in.$^2$: Using a merged notched head on advanced low noise media (invited).
Digests of the Magnetic Recording Conference, 1998 Magnetic Recording Heads, Aug. 17–19, 1998, Boulder, Co.
IEEE Transactions on Magnetics, Mar. 1999, vol. 35, No. 2, IEMGAQ (ISSN 0018–9464).

* cited by examiner

*Primary Examiner*—John R. Lee
*Assistant Examiner*—Kalimah Fernandez
(74) *Attorney, Agent, or Firm*—Robert O. Guillot; Intellectual Property Law Offices

(57) ABSTRACT

The improved method for trimming a magnetic head utilizing a FIB tool includes a step of aligning the FIB tool milling boxes without imaging critical pole tip components and structure. The method includes the creation of an alignment box that is disposed in a known, fixed orientation relative to the FIB tool milling boxes. The FIB tool is aligned by imaging only the alignment box and by moving the alignment box relative to known pole tip structural characteristics that are disposed away from the critical pole tip components. The alignment box is visually aligned on non-sensitive pole tip components in such a manner that the milling boxes will be properly aligned relative to the sensitive pole tip components. FIB tool milling is thereafter performed within the milling boxes which have been accurately aligned without imaging of sensitive pole tip components.

17 Claims, 4 Drawing Sheets

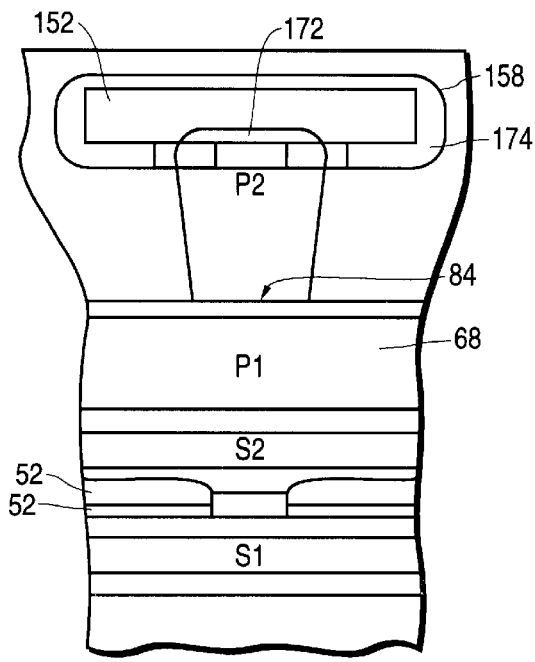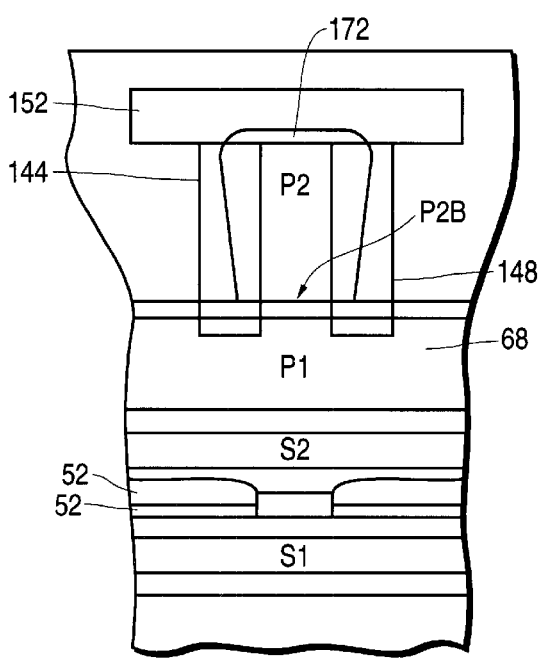
FIG.8  FIG.9
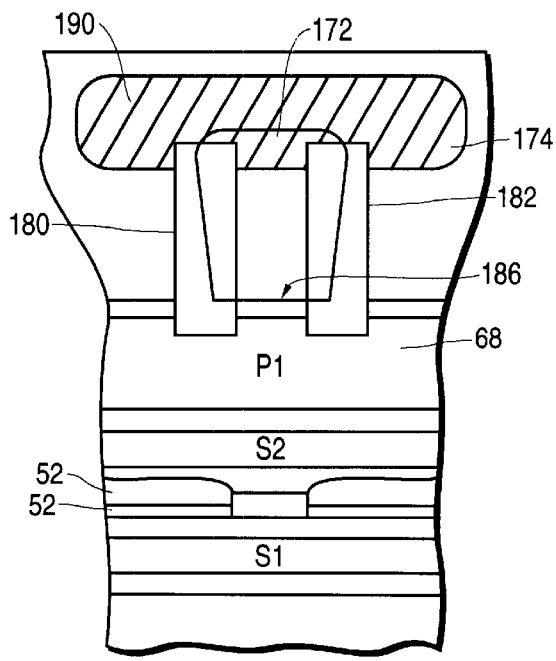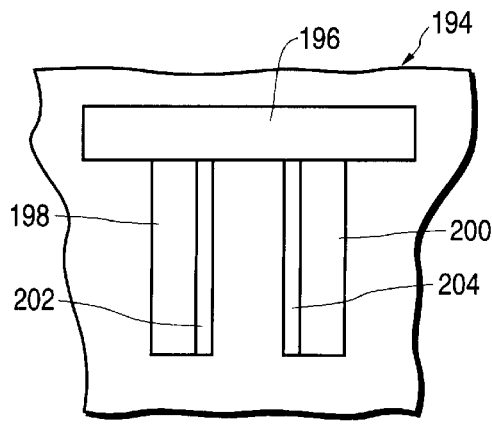
FIG.10  FIG.11

PROCESS FOR MINIMIZING ELECTROSTATIC DAMAGE AND POLE TIP RECESSION OF MAGNETORESISTIVE MAGNETIC RECORDING HEAD DURING POLE TIP TRIMMING BY FOCUSED ION BEAM MILLING

BACKGROUND OF THE INVENTION

1. Field of the Invention

The present invention relates generally to devices and methods for manufacturing magnetic recording heads, and more particularly to devices and methods for utilizing focused ion beam milling devices to trim recording head pole tips.

2. Description of the Prior Art

Thin film magnetic recording heads are generally utilized in the data storage industry to record data onto magnetic media, such as magnetic hard disks. It is an industry-wide goal to store ever increasing quantities of data upon the magnetic media by increasing the areal density of the data stored on the media. The areal density is typically increased by increasing the linear density of the data bits (bits per inch, BPI), and/or by writing the data in narrower tracks (tracks per inch, TPI). With regard to hard disks, where the data is written in narrower circular tracks on the disk, more data tracks per inch can be written and therefore more data can be stored on the disk when the TPI is increased.

The width of the data track that is written by a recording head is generally determined by the width of the second magnetic pole, termed the P2 pole, of the write head, and efforts have been undertaken in the prior art to devise methods for reducing the width of the base of the P2 pole, commonly referred to as the P2B dimension. These prior art methods have included the use of ion beams to irradiate selected areas of the P2 pole to remove material and thereby reduce the P2B dimension.

With particular regard to the present invention, the use of a focused ion beam (FIB) to mill portions of the P2 pole to reduce the P2B dimension is known. For instance, the Micrion MicroMill HT is a FIB tool system manufactured by the Micrion Corporation, Peabody, Mass., that is specifically designed for milling magnetic heads. Such prior art efforts have indeed reduced the P2B dimension, however the use of such FIB tools, particularly where the P2B dimension is quite small can be problematic. The problems are created during the preliminary step of accurately aligning the FIB tool to accomplish accurate beam milling in the selected portions of the P2 pole. The accurate alignment has previously necessitated the FIB tool imaging of the entire P2 pole in order to align the milling boxes of the FIB tool on the desired portions of the P2 pole for material removal. The FIB tool imaging is accomplished by irradiating the imaged surface with the FIB tool ion beam such that the secondary emissions from the irradiated surface are used for visualization purposes. Significantly, the ion beam irradiation that is necessary for visualization and alignment actually performs unwanted milling on all of the irradiated surface area that is being imaged. Where the read head dimensional parameters and tolerances are small, as is the case where increased areal density of data storage is desired, the milling of critical surfaces during the P2 pole imaging step for milling box alignment can result in seriously degraded performance of the writing components and reading components of the recording head through recession of pole tip components away from the air bearing surface (ABS) of the recording head. Therefore, a need exists for an improved method for aligning the milling pattern of an FIB tool for pole tip trimming which does not require imaging of critical pole tip components during the milling box alignment process. The present invention provides such an improved FIB tool alignment method.

SUMMARY OF THE INVENTION

The improved method for trimming a magnetic head utilizing a FIB tool includes a step of aligning the FIB tool milling boxes without imaging critical pole tip components and structure. The method includes the creation of an alignment box that is disposed in a known, fixed orientation relative to the FIB tool milling boxes. The FIB tool is aligned by imaging only the alignment box and by moving the alignment box relative to known pole tip structural characteristics that are disposed away from the critical pole tip components. The alignment box is visually aligned on non-sensitive pole tip components in such a manner that the milling boxes will be properly aligned relative to the sensitive pole tip components. FIB tool milling is thereafter performed within the milling boxes which have been accurately aligned without imaging of sensitive pole tip components.

It is an advantage of the present invention that the performance characteristics of FIB tool trimmed magnetic recording heads is improved, such that the areal density of data written on magnetic media can be increased.

It is another advantage of the present invention that more accurate writing of data to magnetic media and reading of data from magnetic media is obtained.

It is a further advantage of the present invention that critical magnetic head components are not degraded during FIB tool trimming.

It is a further advantage of the present invention that the alignment of FIB tool milling boxes upon a pole tip is achieved without ion beam irradiation of critical pole tip components.

It is yet another advantage of the present invention that electrostatic damage to critical head components is reduced, because such components are not irradiated by the ion beam.

It is yet a further advantage of the present invention that a FIB tool milling box configuration has been developed which includes an alignment box and at least one milling box, such that the milling box can be accurately aligned upon a pole tip through FIB tool imaging of only the alignment box upon top portions of the P2 pole.

These and other objects and advantages of the present invention will become well understood by those skilled in the art upon reading the following detailed description which makes reference to the several figures of the drawings.

IN THE DRAWINGS

FIG. 8 is a plan view of a recording head having the alignment box portion of the milling box configuration of FIG. 6 imaged thereon;

FIG. 9 is a plan view depicting the orientation of the milling box configuration of the present invention upon a magnetic recording head prior to milling;

FIG. 10 is a plan view of a magnetic recording head following FIB milling according to the present invention; and FIG. 11 depicts an enhanced FIB milling box configuration of the present invention for use in milling a magnetic recording head according to the method of the present invention.

DETAILED DESCRIPTION OF THE PREFERRED EMBODIMENTS

Figure 1:
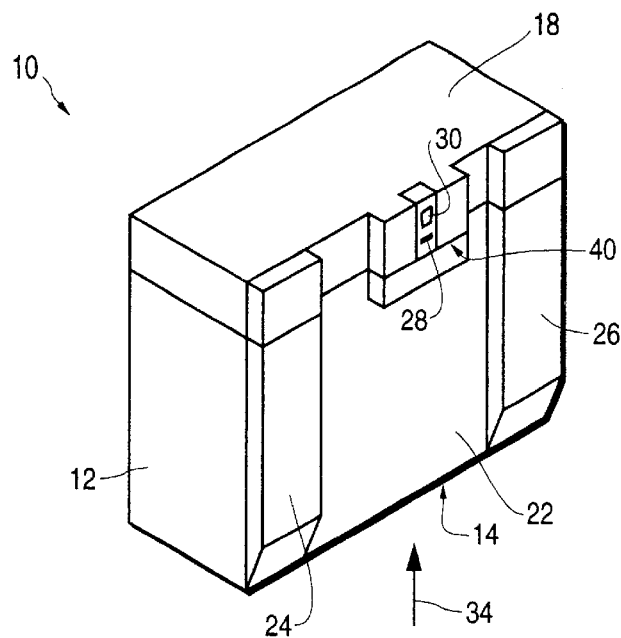
FIG. 1 is a perspective view of the air bearing surface side of a slider having a magnetic recording head.

The reading and writing of data from magnetic media, such as hard disks is typically accomplished utilizing a device known as a slider or head 10 that operationally resides in close proximity to the moving magnetic media. As depicted in FIG. 1, a typical prior art head 10 includes a solid, generally rectangular substrate base 12 member having a front surface 14, a rearward surface 18 and an air bearing surface (ABS) side 22 having air bearing surface members, such as side rail ABS members 24 and 26 formed thereon. Read head elements 28 and write head elements 30 are formed on the rearward portion of the ABS surface side 22 to interact with the surface of the magnetic media (not shown) that travels in the direction of arrow 34 relative to the ABS surface side 22 of the head 10.

Figure 2:
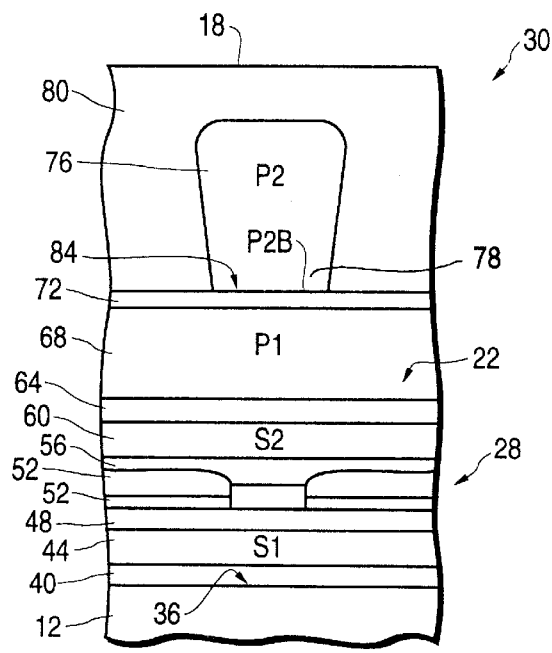
FIG. 2 is an enlarged plan view of the magnetic recording head depicted in FIG. 1.

FIG. 2 depicts an enlarged plan view of the read and write head elements 28 and 30 respectively as viewed on the ABS side 22 of the head 10. As depicted therein, the read and write head elements include a plurality of layers that are sequentially formed on the rearward portion of the substrate base 12 during the manufacturing process. In a typical fabrication process, though not limited to the present invention, the substrate base 12, formed of alumina-titanium carbide, as is known in the prior art, undergoes a plurality of thin film deposition process steps which result in the formation on the substrate end surface 36 of an alumina layer 40, a first shield S1 layer 44, followed by an insulator layer 48, followed by magnetoresistive read head layers 52, followed by a second insulator layer 56, followed by a second shield S2 layer 60, followed by a third insulator layer 64 followed by a first pole P1 layer 68, followed by a write gap layer 72, followed by a second pole P2 layer 76 including a relatively narrow P2 pole tip 78, followed by a fifth insulator layer 80. An induction coil is typically fabricated following the deposition of the write gap layer 72 and prior to the fabrication of the P2 pole 76. As is well known, the data track width produced by such prior art heads 10 is primarily determined by the width of the base portion 84 of the P2 pole tip 78, which is known as the P2B width.

Figure 3:
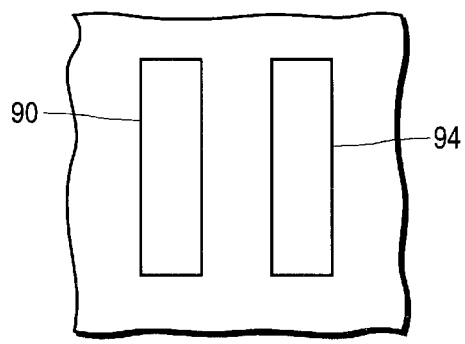
FIG. 3 depicts a pair of milling boxes of a focused ion beam device as utilized in the prior art.

The ongoing effort to increase areal data storage density on magnetic media has led to efforts to reduce the P2B width, such that the track width is reduced and more tracks per inch (TPI) can be written onto the magnetic media, such as a hard disk. One of the prior art methods for reducing the P2B width is to utilize a focused ion beam (FIB) device to mill out portions of the P2 pole tip 78, such that the effective P2B width is reduced. The Micrion MicroMill HT is a FIB device manufactured by the Micrion Corporation, Peabody, Mass that is specifically designed for magnetic head pole tip milling; MicroMill is a trademark of Micrion Corporation. In the prior art FIB milling process, two generally rectangular milling boxes are created to visually align and control the FIB milling ion beam. FIG. 3 depicts a pair of such milling boxes 90 and 94. The milling boxes and 90 and 94 are software created virtual boxes that represent the boundaries within which the FIB milling beam is constrained during the milling process, as is next discussed with reference to FIG. 4.

Figure 4:
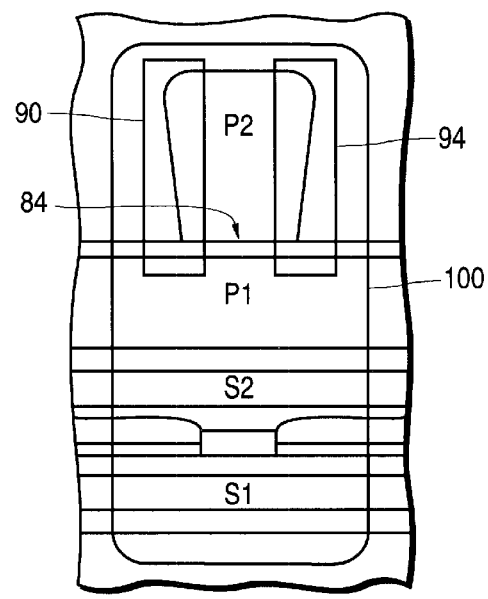
FIG. 4 is a plan view of the FIB imaging of the head of FIG. 2 having the milling boxes of FIG. 3 projected thereon.

FIG. 4 is a plan view of the FIB imaging of the head of FIG. 2 having the milling boxes of FIG. 3 projected thereon. In the prior art FIB milling process, it is first necessary to orient the milling boxes 90 and 94 in an appropriate alignment relative to the structures of the write head, generally, such that the P2 pole tip is milled symmetrically and across the P2B base 84. A typical prior art milling box alignment includes the orientation of the lower portions of the milling boxes 90 and 94 into the P1 pole, such that it will be notched by the FIB milling process.

Significantly, in order to accurately align the milling boxes 90 and 94 in the prior art FIB milling process, it is necessary to image the head 10 utilizing the FIB beam by irradiating the head surface, such that secondary emissions from the head provide visualization of the head. Therefore, as depicted in FIG. 4, the generally rectangular imaging screen 100 of the FIB device, which is utilized to properly orient the milling boxes 90 and 94, represents an area of the head that is irradiated by the ion beam during the imaging process. While the Micrion MicroMill HT FIB device is designed to utilize electronic pattern recognition techniques to provide an automated milling process, the imaging screen 100 is still required to properly align the milling boxes for ion milling. A problem associated with this prior art imaging step, that is undertaken for proper alignment of the milling boxes, is that the ion beam is actually milling the surface of the read element 28 and write element 30 of the head 10 within the imaging screen viewing area 100 during the milling box alignment step. As a result, during the milling box alignment step the read and write elements suffer degradation due to the milling within the imaging screen area 100.

Figure 5:
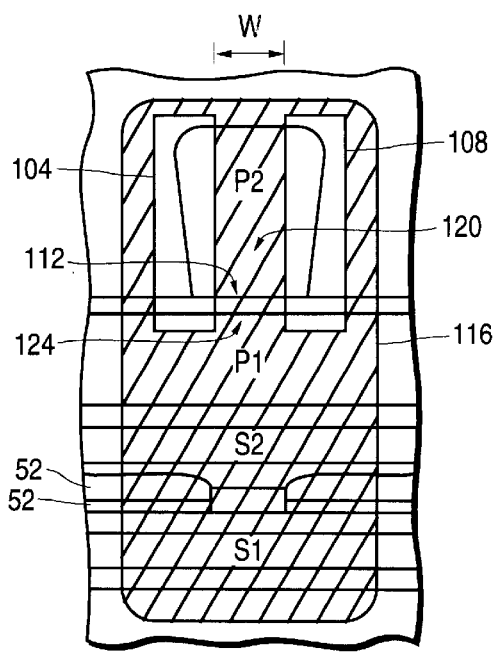
FIG. 5 is a plan view of the head of FIG. 4 following the FIB milling process, as is known in the prior art.

Specifically, FIG. 5 depicts a head of the prior art that has been FIB milled. As depicted therein, the rectangular areas 104 and 108 are portions of the head 10 that have been milled out; these portions 104 and 108 correspond to the areas designated by the milling boxes 90 and 94 shown in FIG. 4. It is seen that the milled P2B base 112 has been changed from its former width to a reduced width W, such that a narrower track width is produced by the milled head. Significantly, however, the larger rectangular area 116 (as identified by cross hatching) corresponding to the size of the imaging screen 100 has also been milled to some extent by the beam during the visualization process step for aligning the milling boxes. It is seen that the milled portions of the head within the imaging area 116 include the central portion 120 of the P2 pole, the central portion 124 of the P1 pole as well as the magnetoresistive read head layers 52. The milling of these areas 120, 124 and 52 during the prior art imaging step represents a significant problem when such heads are utilized to create the very high areal data storage densities that are being contemplated at the present time. Specifically, the milling of the pole surfaces 120 and 124 and the read head layers 52 results in an effective recession of those surfaces away from the ABS surface of the slider. Depending upon the thickness of any protective overcoat on the ABS surface, this can create a larger gap between the surface of the magnetic media and the P1 and P2 pole surfaces, and thus result in a weaker writing signal being transmitted from the prior art write head poles to the media, which ultimately results in overwriting difficulties and errors. Similarly, if milling of the read head layers 52 occurs, this increases the gap between the media surface and the read head, resulting in a weaker read head signal generated within the prior art read head that ultimately results in read errors. Additionally, exposure of the read head layer 52 to the ion beam can result in electrostatic charge damage to the read head during the imaging process. Where a protective overcoat layer is milled, reduced corrosion resistance of the head can result. Therefore, an object of the present invention is to provide a method for imaging the write head elements 30 of the head 10 by the FIB device to align the milling boxes in a manner that does not image the critical head components. Where the P1, P2 and read head layers 52 are not imaged during the milling box alignment step, there is no ion beam milling of these areas and thus no electrostatic charge damage to them, and therefore no degradation in the performance of the write head element and read head element. The head imaging and milling box alignment process of the present invention is next discussed.

Figure 6:
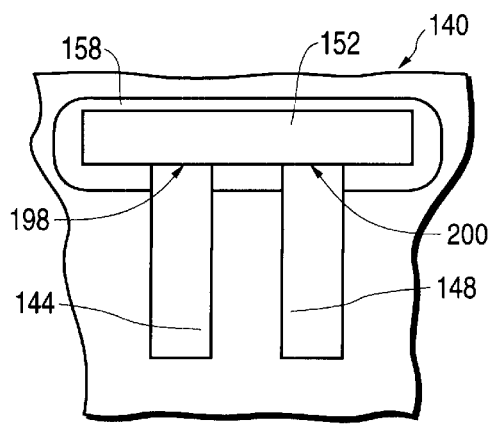
FIG. 6 depicts the FIB milling box configuration of the present invention.

An improved milling box configuration 140 of the present invention is depicted in FIG. 6. The configuration 140, like the milling box configuration depicted in FIG. 3, is a software created virtual milling box configuration. It includes two rectangular milling box areas 144 and 148 that are similar in size and shape to the prior art milling boxes 90 and 94 of FIG. 3. It also includes a novel alignment box 152 that is disposed in a fixed, known orientation relative to the milling boxes 144 and 148. In the preferred embodiment, the alignment box 152 is located at the top ends 156 of the milling boxes 144 and 148, and is symmetrically oriented relative to the two milling boxes 144 and 148. A generally rectangular imaging screen 158 is formed around the alignment box 152. It is significant that the area within the imaging screen 158 is smaller than the area within the prior art imaging screen 100 depicted in FIG. 4, as will become apparent from the following description.

Figure 7:
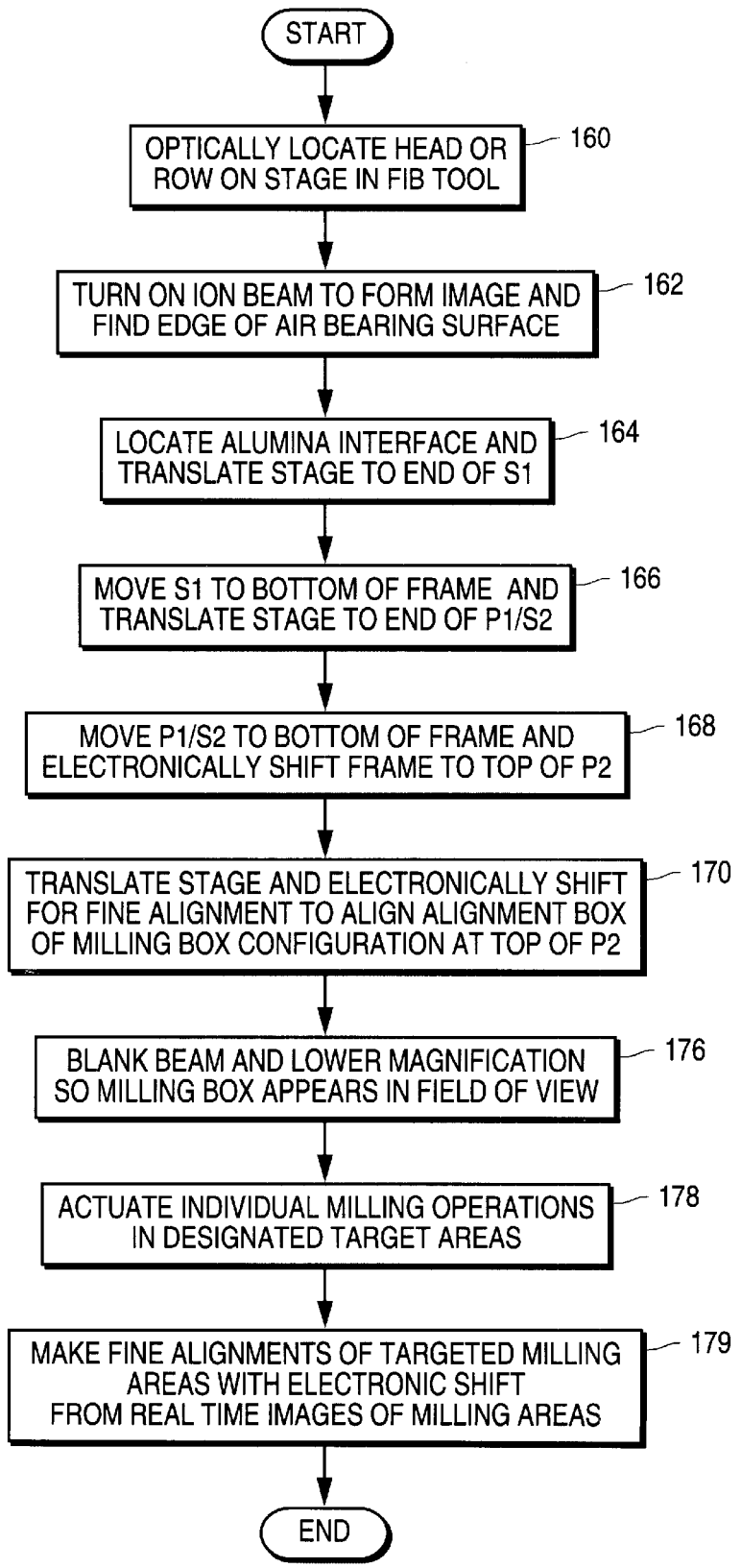
FIG. 7 is a flow chart of the FIB milling steps of the method of the present invention.

The milling box configuration 140 and imaging screen 158 of FIG. 6 is utilized in a series of head imaging steps that ultimately result in the proper orientation of the milling boxes 144 and 148 upon the P2 pole tip without imaging the critical areas of the head, and FIG. 7 presents a schematic flow chart of the imaging and alignment steps. As set forth in FIG. 7, a head 10 is placed on the stage in the FIB tool and an edge of the read/write head is optically oriented 160 relative to the beam. The read and write elements of the head may be disposed upon an air bearing surface of a separated slider, as depicted in FIG. 1 and described hereinabove, or they may be located on a row of heads that is sliced from a disk substrate during the manufacturing process. The FIB tool process for a separate slider head will be further described, it being understood that a similar process is easily implemented for heads disposed in a row sliced from a disk substrate.

Initially, the FIB tool is turned on at a high magnification of an approximately 14 micron field of view, and the ion beam within the imaging screen 158 is utilized to form an initial visualization image 162 to find an edge of the air bearing slider. In the next step 164, with the ion beam on and at a high magnification, the alumina layer 40 at the slider edge is located within the imaging screen 158 and the stage is then translated to image the end of the S1 layer 44. In the next step 166, the stage is translated to visualize the end of the S2 layer 60 and thereafter the end of the P1 layer 68. In the next step 168, the knowledge of the physical size and shape of the P1 and P2 heads is utilized. Specifically, where it is known that the P2 pole tip is generally 3 to 4 microns high, the stage is electronically shifted 2 to 3 microns upward, such that the alignment box 152 within the imaging screen 158 will be generally located at the top of the P2 pole tip. Thereafter, with the alignment box within the highly magnified imaging screen 158 of the FIB tool, the stage is translated 170 to align the alignment box such that the top of the P2 pole tip is visually oriented within the alignment box. FIG. 8 depicts this highly magnified alignment of the top portion 172 of the P2 pole tip within the alignment box 152. It is significant to note that the generally rectangular highly magnified imaging screen 158 of the FIB tool results in the imaging of the area 174 within the imaging screen 158, and this results in only the exposure of the top portion 172 of the P2 pole tip to the ion beam during the imaging process. Thus, only the top portion 172 of the P2 pole is within the area 174 that is milled by the ion beam during the imaging alignment step 170. This is significantly different from the prior art imaging process wherein the significant and sensitive portions of the read head elements and write head elements of the head were exposed within the imaging screen 100 (see FIGS. 4 and 5) and therefore milled by the ion beam during the prior art milling box alignment process as discussed hereabove.

After the alignment box 152 has been properly oriented relative to the top 172 of the P2 pole tip, as depicted in FIG. 8, the ion beam is turned off 176, and the FIB tool is reconfigured to a lower magnification of approximately a 12 to 14 micron field of view, such that a single milling box (144 or 148) of the entire milling pattern (see FIG. 6) will appear in the field of view when the FIB tool beam is turned on. For illustrative purposes, FIG. 9 depicts the entire milling pattern of FIG. 6 as it is oriented with regard to the head 10 following the visual alignment 170 of the alignment box 152 with the top portion 172 of the P2 pole tip. It is seen that the milling boxes 144 and 148 are disposed in substantially the same location as the milling boxes 90 and 94 depicted in FIG. 4. Thereafter, a first, then a second, single milling box is selected and the FIB tool beam is sequentially actuated 178, and each of the milling box areas 144 and 148 are sequentially milled to reduce the width of the P2B base of the P2 pole tip as discussed above. Fine alignment adjustments 179 may be undertaken utilizing the FIB tool during the actual milling operation of the milling boxes 144 and 148, in that the milled portions of the P2 pole may be visualized during the milling operation.

FIG. 10 depicts the head 10 following the FIB milling according to the present invention. As depicted in FIG. 10, milled out rectangular areas 180 and 182 create a narrow P2B width 186 that will create a reduced track width. The significantly reduced ion beam milled area 190 that corresponds to the imaging frame area 174 is shown in cross hatching. As discussed above, only the top portion 172 of the P2 pole tip was imaged to orient the milling boxes 144 and 148; thus, only the top portion 172 of the P2 pole tip was milled during the milling box alignment process. Therefore, neither the P2B surface of the P2 pole tip, nor the P1 pole, nor the read element layers 52 of the head were exposed to the ion beam's milling effect during the imaging steps for the milling box alignment process. Therefore, the FIB milling process of the present invention results in an improved milled head over the prior art FIB tool milled head.

As will be apparent to those skilled in the art after having read the preceding description of the present invention, the use of computerized electronic pattern recognition techniques can facilitate the automation of the present invention. That is, after the alignment box and imaging screen have been created, the magnetic head imaging steps described hereabove with reference to the flow chart of FIG. 7 can be accomplished in an automated manner utilizing pattern recognition technology. The present invention is therefore not to be limited to manual alignment steps described herein; but rather, it is intended to encompass such electronic pattern recognition techniques.

The present invention is not to be limited to the specific design of the milling boxes and alignment box disclosed in FIG. 6. Rather, while that alignment box, milling box configuration satisfies the need to align the milling boxes without imaging the entire head, other milling, box and alignment box configurations are to be included within the present invention. For instance, FIG. 11 depicts an alternative alignment box and milling box configuration 194 having an upper alignment box 196 and a plurality of milling boxes 198, 200, 202 and 204, where boxes 202 and 204 may be utilized subsequent to milling in boxes 198 and 200 to create a more accurately trimmed P2 pole tip.

While the present invention has been shown and described with regard to certain preferred embodiments, it is understood that those skilled in the art will no doubt devise various alterations and modifications thereto which nevertheless include the true spirit of the invention. It is therefore intended by the inventors that the following claims cover all such alterations and modifications that nevertheless include the true spirit and scope of the present invention.

What is claimed is:

1. A method for trimming a magnetic recording head utilizing a FIB tool comprising the steps of:
   orienting a magnetic recording head relative to said FIB tool for trimming;
   aligning said FIB tool for milling a pole tip portion of a magnetic pole of said magnetic recording head, by exposing a first portion of said magnetic pole to an imaging ion beam of said FIB tool without exposing said pole tip portion to said imaging ion beam of said FIB tool during said aligning step; and
   milling said pole tip portion of said magnetic recording head.

2. A method for trimming a magnetic recording head as described in claim 1 including the step of creating a FIB tool milling box configuration including a virtual alignment box and at least one virtual milling box, wherein said virtual alignment box is disposed in a fixed orientation relative to each said virtual milling box, and wherein said step of aligning said FIB tool includes the step of aligning said virtual alignment box relative to said pole tip portion of said magnetic recording head.

3. A method for trimming a magnetic recording head as described in claim 2 wherein said first portion of said magnetic pole is a top portion of a P2 pole of said magnetic recording head.

4. A method for trimming a magnetic recording head as described in claim 3 including the further step of exposing edge portions of said magnetic recording head to said imaging ion beam prior to said step of exposing said top portion of a P2 pole to said imaging ion beam to align said virtual alignment box.

5. A method for trimming a magnetic recording head as described in claim 4 including the further step of exposing a pole tip portion of said P2 pole to a milling ion beam using said virtual milling box subsequent to said step of exposing said top portion of a P2 pole to said imaging ion beam to align said virtual alignment box.

6. A method for trimming a magnetic recording head as described in claim 5 wherein a plurality of magnetic heads within a row are sequentially trimmed.

7. A method for trimming a magnetic recording head utilizing a FIB tool, comprising the steps of:
   orienting a magnetic recording head relative to a FIB tool for trimming;
   aligning said FIB tool for milling a pole tip portion of a magnetic pole of said magnetic recording head using an imaging ion beam without imaging said pole tip portion during said aligning step; and
   milling said pole tip portion of said magnetic recording head.

8. A method for trimming a magnetic recording head as described in claim 7 including the step of creating a FIB tool milling box configuration including a virtual alignment box and at least one virtual milling box, wherein said virtual alignment box is disposed in a fixed orientation relative to each said virtual milling box, and wherein said step of aligning said FIB tool includes the step of aligning said virtual alignment box relative to said pole tip portion of said magnetic recording head.

9. A method for trimming a magnetic recording head as described in claim 8 wherein said step of aligning said FIB tool includes the steps of imaging a top portion of a P2 pole of said magnetic recording head to align said virtual alignment box relative to said P2 pole.

10. A method for trimming a magnetic recording head as described in claim 9 including the further step of imaging edge portions of said magnetic recording head prior to said step of imaging said top portion of a P2 pole to align said virtual alignment box.

11. A method for trimming a magnetic recording head as described in claim 10 including the further step of using said virtual milling box to further align a milling ion beam subsequent to said step of imaging said top portion of a P2 pole within said virtual alignment box.

12. A method for trimming a magnetic recording head as described in claim 11 wherein said steps of aligning said virtual alignment box, imaging said top portion of a P2 pole, and imaging edge portions of said magnetic recording head are each performed utilizing electronic pattern recognition techniques.

13. A method for trimming a magnetic recording head as described in claim 12 wherein a plurality of magnetic heads within a row are sequentially trimmed.

14. A method for aligning a FIB tool for magnetic recording head trimming, comprising the steps of:
   creating a virtual milling box configuration, including a virtual alignment box and at least one virtual milling box, wherein said virtual alignment box is disposed in a known orientation relative to each said virtual milling box;
   imaging a top portion of a P2 pole of said magnetic head within said virtual alignment box to align said virtual milling box configuration relative to said P2 pole, such that a base portion of said P2 pole is not imaged during said imaging step;
   milling said base portion of said P2 pole within said virtual milling box.

15. A method for aligning a FIB, tool for magnetic head trimming as described in claim 14 including the further step of imaging edge portions of said magnetic head prior to said step of imaging said top portion of a P2 pole within said virtual alignment box.

16. A method for aligning a FIB tool for magnetic head trimming as described in claim 15 including the further step of imaging a portion of said P2 pole using said virtual milling box to further align a milling ion beam subsequent to said step of imaging said top portion of a P2 pole within said alignment box.

17. A method for trimming a magnetic recording head as described in claim 16 wherein a plurality of magnetic heads within a row are sequentially trimmed.

* * * * *